Oct. 6, 1959  T. W. SWAFFORD, JR  2,907,400
CORRELATION OF SEISMIC SIGNALS
Filed May 12, 1954  3 Sheets-Sheet 3

INVENTOR.
Thomas W. Swafford, Jr.
BY
Alexander & Dowell
attorneys

United States Patent Office 2,907,400
Patented Oct. 6, 1959

2,907,400

CORRELATION OF SEISMIC SIGNALS

Thomas W. Swafford, Jr., Irving, Tex., assignor to The Geotechnical Corporation, Dallas, Tex., a corporation of Delaware Application May 12, 1954, Serial No. 429,154

7 Claims. (Cl. 181—.5)

This invention relates to geophysical exploration and more particularly relates to the art of detecting and recording seismic information, the principal novelty lying in the method of detection wherein a correlation system is employed to enhance the reflected or refracted components of the seismic wave and thereby in effect repress the noise components, which have a tendency to obscure the useful information.

As in most present-day seismic exploration systems, the present invention employs one or more vibration transducers, or groups of transducers, placed upon the ground surface to receive and translate earth movements into electrical signals which are amplified and recorded on an accurate time base. In order to determine the depth of subsurface horizons, an elastic wave is generated, commonly by an explosive charge detonated below the ground surface in a bore hole, and the travel time of the elastic wave from detonation to a reflecting or refracting horizon and back to a transducer is measured. From the travel time of the wave and from a prior knowledge of the velocity of travel of the wave in a particular locality, the depth of the horizon may be determined, as is well known in the art. In this specification and in the appended claims the word "reflected" when used in connection with the signals received at a transducer is to be construed as also including refracted vibrations.

It is also well known that most seismic survey systems include frequency-selective filters designed to pass that portion of the frequency spectrum in which the information-bearing reflected or refracted waves are included, and designed to attenuate those frequency components which bear no useful information. In most geographical localities, the frequency of the information-bearing components lies within a range of 30 to 80 cycles per second. Unfortunately, this type of filtering is responsive only to the spectral amplitude distribution of the signals involved and does not make use of the phase information. This type of filtering will hereinafter be referred to as "frequency domain filtering."

For any filter to have optimum characteristics for seismic applications, both the amplitude and phase spectra must be utilized. Seismic information-bearing signals are random functions of time and can best be described in terms of their statistical characteristics, and therefore the present improvement in the seismograph necessarily utilizes statistical properties of the signals in their interpretation.

The present invention contemplates the use of "time domain filtering," which, as is known in the prior art, is based on statistical concepts, as will be hereinafter explained. More particularly, this invention provides a method and apparatus for separating from seismometer signals the information-bearing components, as distinguished from the non-useful components, by applying the theory of cross-correlation to the problem, this method utilizing both amplitude and phase information.

It is known in the prior art relating to correlation that a complex time function may be cross-correlated with another time function to provide a resultant output which represents the degree of time coherence between said other function and those components of the complex function that have the same frequency and phase. It is also known that if the integration of the time function with the complex function is performed by a "leaky" integrator of the resistor-capacitor type, the resulting output will also be a time function on the same time base as said complex function and will have instantaneous amplitudes dependent on the degree of time coherence between the two correlated signals for corresponding instants of time. Such a correlator is known in the art as a multiplier-averager, and it is to this type of correlation that the present invention relates.

The present invention provides for the correlation of a seismic signal with an artifically generated time function. The characteristics of this artifical time function are controllable by the operator of the equipment and are adjusted and re-adjusted so as to ultimately produce a function which approximates as nearly as possible the reflected signal components of the total seismic signal. Each time that a seismic signal and an artificial time function are correlated, the output of the correlation equipment represents the degree of time coherence between the artificial time function and coherent components of the total seismic signal. The phrase "degree of time coherence" means the extent to which components of the total seismic signal are in phase with the artificial time function, and the output correlogram of the integrator is a "graph" plotted on the same time base as the seismic signal, the amplitude of the graphical values at each instant representing the instantaneous degrees of time coherence. The seismic signal may be recorded when first received so that it may be subsequently correlated over and over again with a different artificial time function each time until an artificial time function is found which correlates best with those components of the seismic signal which bear useful information of the subsurface horizons. A trained operator will recognize this optimum correlation and can read therefrom the correct location in time of the information bearing components of the seismic signal. In effect this method of correlation "extracts" from the total seismic signal those components which are coherent with the artificially generated time function each time the correlation process is repeated, and by trial and error an artificial function is eventually found which will "extract" from the total seismic signal those components which bear the most useful information.

The principal object of this invention is to provide a novel method and apparatus for applying the theory of cross-correlation to seismic signals for the purpose of separating the useful components from the total signal, which signal also includes noise components and ground roll as well as useful components comprising seismic messages which contain information with respect to subsurface horizons. This invention may be applied to the detection of seismic signals from the output of either a single seismometer or the outputs of a plurality of spacer seismometers, the latter application providing a more flexible and efficient system for reasons well known to those skilled in the art.

Another very important object of this invention is to provide a method and apparatus of the above type wherein is included the step of recording the output of the seismometer, or of the seismometers, so that the output may be run through the detector-correlator a number of times, the parameters of the circuit being altered each time so that the respective output correlograms will each differ from the others to provide enhancements of different messages contained in the output of the seismometer, or seismometers.

A further important object of my invention is to provide a multiplier-averager correlation system for use in signal detection wherein the correlogram obtained by the cross-correlation with a time function of the seismic signal from a particular seismometer may be mathematically expressed as the integral for the duration of the seismic signal of the seismometer signal squared, the other time function being cancelled out of the correlogram, in the manner hereinafter explained.

Other objects and advantages of this invention will become apparent during the following detailed discussion of the drawings, wherein.

Figure 1:
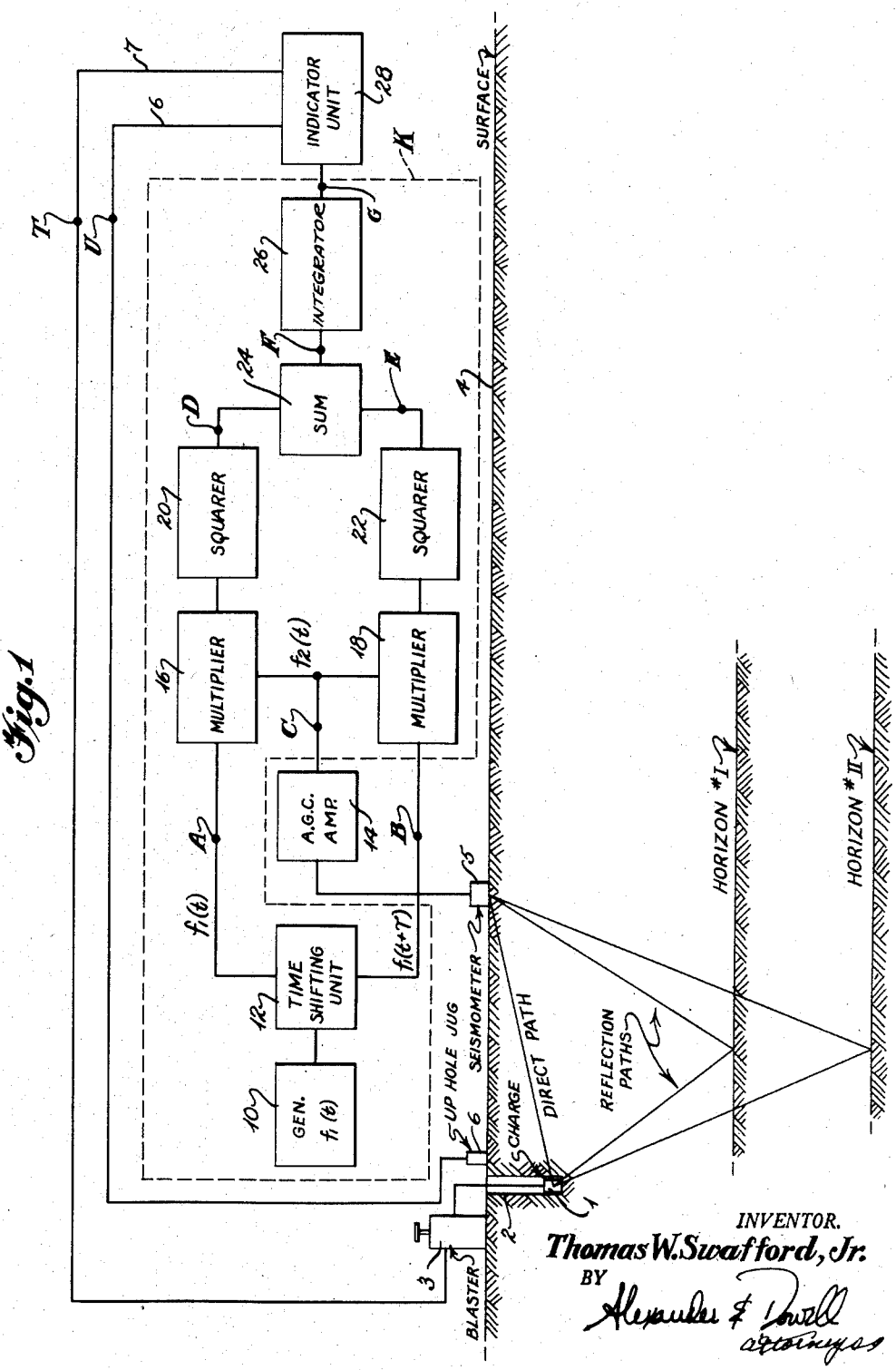
Figure 1 is a schematic block diagram showing a shot hole, charge and blaster, time-break and up-hole circuits, two subsurface horizons, a seismometer for receiving the reflected or refracted waves, a function correlator, and an indicator unit for providing a presentation of the detected and correlated information.
Figure 3:
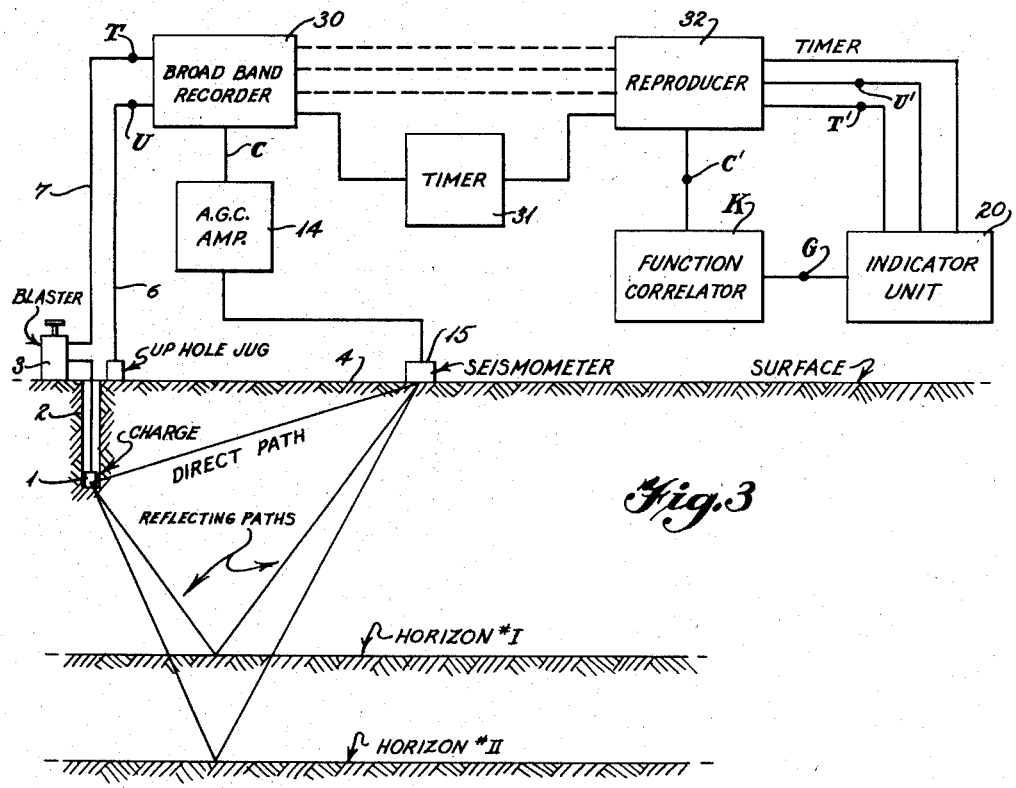
Fig. 3 is a block diagram of the type shown in Fig. 1 but modified to include means for recording the seismometer signal to permit it to be run through the function correlator a number of consecutive times, the parameters of the circuit being altered each time to enhance different messages of the recorded seismometer output.
Figure 4:
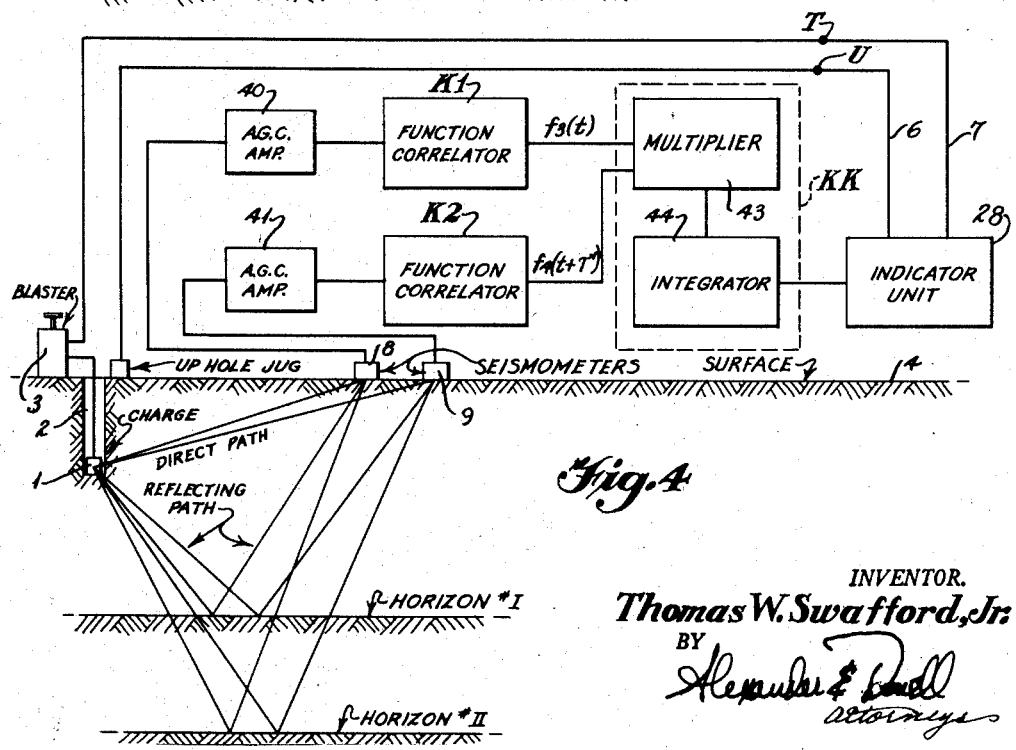
Fig. 4 is a further modified block diagram similar to Fig. 1 but showing the application of the present invention to a seismic survey system wherein more than one seismometer is employed, the seismometers being mutually spaced apart to cancel out undesirable components.

Referring now to the drawings, in Fig. 1 is shown a particular embodiment of the invention connected to detect seismic information from the output of standard seismic survey equipment. This conventional equipment includes a shot charge 1 located at the bottom of a shot hole 2 and connected to a blaster 3 which controls the detonation of the charge 1. Below the surface 4 of the ground are illustrated two geological horizons labeled #I and #II, respectively, the latter being located at a greater depth below the ground surface 4 than the former, and the horizons representing discontinuities sufficient to reflect part of the shock wave generated by detonation of the charge 1. Other standard components of the survey system include a seismometer 5 to receive the reflected or refracted waves, an up-hole jug 6 for measuring the velocity of the propagated waves through the weathering, and a time-break circuit 7 connected to the blaster for providing an indication of the instant of detonation of the charge 1. Similar parts in Figs. 1, 3 and 4 are designated by similar reference characters, and in Fig. 4, where two seismometers are employed, the seismometers are provided with the reference characters 8 and 9, respectively. All of these components are well known in the prior art and form no part of the present invention.

The function correlator K shown in Fig. 1 enclosed in dashed lines includes a function generator 10 capable of generating functions within the approximate spectral frequency range of 30 to 80 c.p.s., the output being controllable within this range and stable for the function selected. The function $f_1(t)$ generated by the generator 10 is fed into a time shifting unit 12 which divides the function into quadrature components, so that the output wire A carries $f_1(t)$ and the output wire B carries $f_1(t+\tau)$.

The output of the seismometer 5 is fed into an automatic-gain-control amplifier 14 which provides an output at C which is the amplified seismic signal plus noise and is a complex time function and which may be represented as $f_2(t)$.

Figure 2:
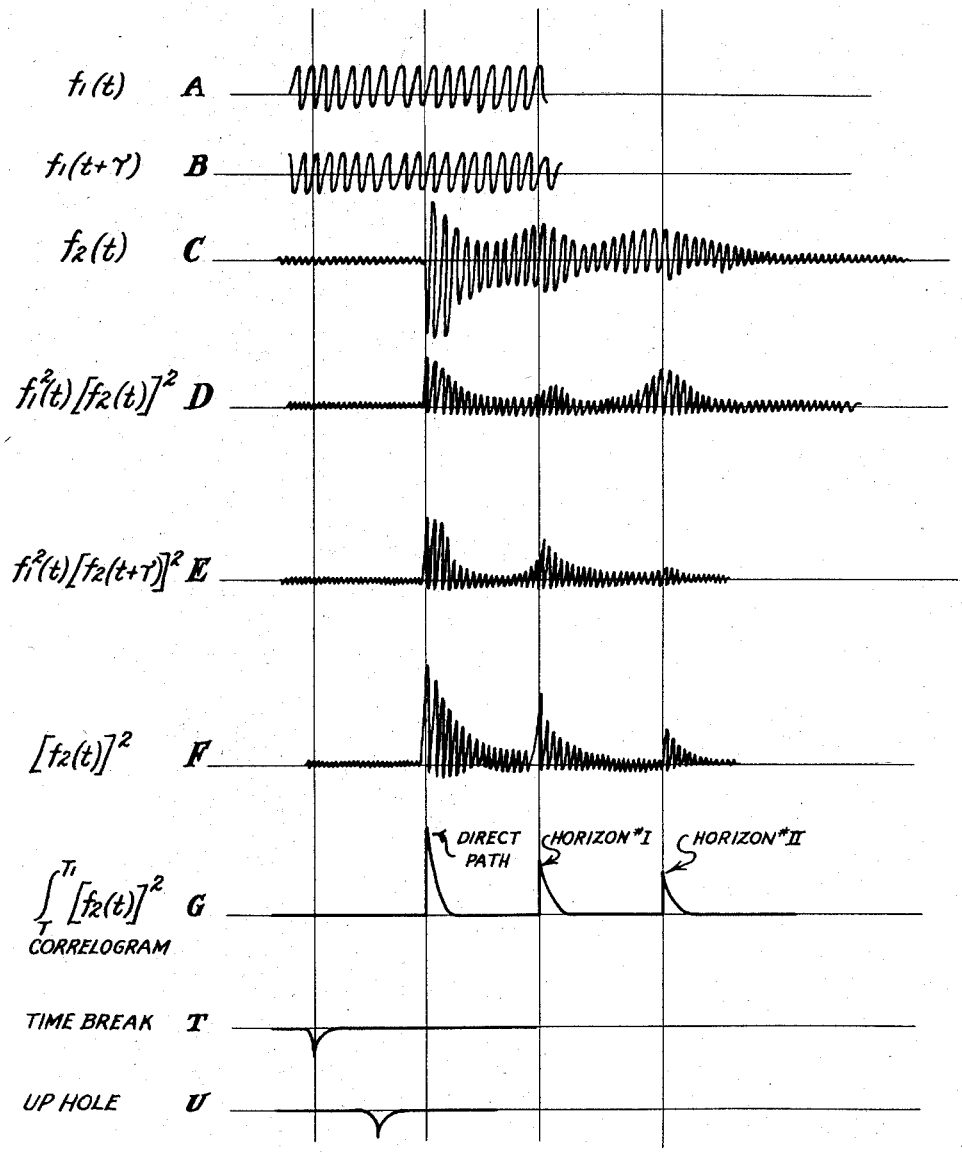
Fig. 2 is a chart illustrating characteristic wave forms corresponding to signals at designated points in the block diagram of Fig. 1.

As shown in Fig. 1, the outputs of the time shifting unit 12 are respectively mixed with the output of the automatic-gain-control (A.G.C.) amplifier 14 in two identical multiplier units 16 and 18, respectively, the output of the multiplier 16 being represented mathematically as $f_1(t)f_2(t)$, and the output of the multiplier 18 being $f_1(t+\tau)f_2(t)$. The respective multiplied signals are then each squared by the squarer units 20 and 22, respectively, so that the signal at D may be represented as $$f_1^2(t)f_2^2(t)$$

and the signal at E may be represented as $f_1^2(t+\tau)f_2^2(t)$, see Fig. 2.

The latter multiplied and squared functions are then added together by the summation unit 24 so that the signal at F may be represented as:

$$f_1^2(t)f_2^2(t)+f_1^2(t+\tau)f_2^2(t)$$

Now consider the simple case where $f_1(t)$ is a sine wave. Then the output at A becomes $\sin \omega_1(t)$, and at B becomes $\cos \omega_1(t)$. The output at F may now be expressed:

$$\sin^2 \omega_1(t)f_2^2(t)+\cos^2 \omega_1(t)f_2^2(t)$$
$$=f_2^2(t)[\sin^2 \omega_1(t)+\cos^2 \omega_1(t)]=f_2^2(t)$$

because $[\sin^2+\cos^2]=1$. Other types of $f_1(t)$ functions may be similarly expressed.

The signal at F is then fed into a leaky resistor-capacitor (R–C) integrator 26, the resistance and capacitance values being chosen so that the integration of the summed signal at F will be continuous to provide at G a correlogram function on the same time-base as the input function $f_2(t)$ from the seismometer 5 and amplifier 14.

As may be seen in Fig. 2, the integrated signal at G is a correlogram showing, plotted as amplitude, voltages which represent the degree of time coherence between components of the seismic signal $f_2(t)$ and the function $f_1(t)$, the correlogram being on the same time-base as the seismic signal $f_2(t)$.

The correlogram at G is then fed into the indicator unit 28 and recorded and/or visually displayed along with the time-break signal 7 and the up-hole signal 6, these respective signals coming from the wires T and U, Figs. 1 and 2. The recorded and/or displayed signals include G, T and U and are illustrated in Fig. 2, although the seismometer signal C may also be included at the indicator unit 28 for further checking of the meaning of the correlogram G.

As pointed out in the short description of the figures, supra, Fig. 3 illustrates a seismic detection system which is similar to the system shown in Fig. 1 but which includes additional recording means for recording the amplified seismic signal C before it is correlated so as to permit the signal to be subsequently run through the correlator a number of successive times, the characteristics of the function $f_1(t)$ being altered each time.

The diagram of Fig. 3 includes the same conventional equipment for propagating an elastic wave and for receiving a reflected or refracted signal which is amplified in the A.G.C. amplifier 14. The signals at C, T, and U are the same as those shown in Fig. 2 but are fed into a recorder 30 controlled by a timer 31. The recorder 30 may be of any suitable type which will provide a sufficiently broad band of frequency response and which is capable of "playing-back" the recorded signals. Recordings made on film or on magnetic tape have been found quite satisfactory since either type may easily be adapted to record simultaneously the time-break and up-hole signal in side-by-side relation with the seismic signal.

The recorded signals are then played back by a reproducer unit 32, which may be the same machine as the recorder 30, and the played-back signals C′, T′ and U′ are then introduced into the correlator and indicator units which are identical to those shown in Fig. 1 and include the function correlator K and the indicator unit 28. The timer unit 31 may also be used to control the reproducer 32. As stated above, by reproducing the C′, T′, U′ signals a number of successive times and changing the parameters of the function correlator K each time, different correlograms G may be produced to show enhancement of different components of the seismic signal C.

The system in Fig. 4 is also similar to that in Fig. 1, but includes another seismometer 9 spaced from a first seismometer 8 and having its own separate function correlator whereby when the separate signals from each of the seismometers 8 and 9 have individually been cross-correlated with the function $f_1(t)$, the respective correlograms may then be mutually cross-correlated to further enhance the information-bearing components common to each. It is to be understood that, although only two seismometers are shown in this circuit, the invention is not to be limited to two seismometer circuits, but may include as many as desired. It is also to be understood that either a single function generator 10 and time shifting unit 12 may be used in the system, or alternatively a separate generator and time shifter may be used for each function correlator. Other variations in the circuits may be made within the scope of the claims.

The units shown in Fig. 4 include the same conventional means for propagating an elastic wave in the ground and for providing a time-break signal T, and an up-hole signal U, but in this diagram two seismometers 8 and 9 are employed, and are spaced one from the other in order to introduce a delay in the arrival of the seismic signals, the delay being designated as $\tau'$. The output of the seismometer 8 is amplified in the A.G.C. amplifier 40 and is then fed into a function correlator K1 which is identical to the function correlator K in Fig. 1. Likewise, the output of the seismometer 9 is amplified by the A.G.C. amplifier 41 and is then fed into a separate function correlator K2, similar to K1.

The output correlogram from the correlator K1 may be represented as $f_3(t)$ and is similar to the output of the correlator K2 which may be expressed as $f_4(t+\tau')$, the principal difference however being that the latter correlogram is delayed in time by the amount $\tau'$ due to the spacing between the seismometers 8 and 9.

These two correlograms, $f_3(t)$ and $f_4(f+\tau')$, are then fed into a cross-correlator KK which is of the well known multiplier-averager type and includes a multiplier 43 and a leaky R–C integrator 44, the latter unit 44 being similar to the integrator 26, Fig. 1, and the former unit 43 being similar to the multiplier 16 or to the multiplier 18 in Fig. 1.

Thus it may be seen that the output correlogram of the cross correlator KK is a further enhancement of the correlogram outputs $f_3(t)$ and $f_4(t+\tau')$ from individual function correlators K1 and K2, and that it may be represented as:

$$\int_0^T f_3(t)f_4(t+\tau')$$

This correlogram is displayed and/or recorded on the indicator unit 28 in the same fashion as set forth above in connection with Fig. 1.

The particular circuits used in the individual units of the block diagrams are well known in the electronics art and are therefore not illustrated in detail. Circuits which will function satisfactorily may be found in Seely, "Electron-Tube Circuits," McGraw-Hill Book Company, and other texts.

Operation

When the charge 1 is detonated, shock waves travel downwardly into the earth and part of the energy of the waves is redirected upwardly by the subsurface horizons, a part of the redirected wave energy reaches the seismometer 5, or seismometers 8 and 9, and is converted thereby into electrical wave forms, which when amplified become the function $f_2(t)$. Only some of the components of this function bear seismic information of value in locating subsurface horizons, and the useful components generally have a characteristic wave shape, which is tantamount to saying characteristic amplitude and phase spectra distribution. The problem with which this invention is concerned is the separation of the components bearing useful information from other components which appear in the function $f_2(t)$, without resorting to "frequency domain" filtering as explained above.

Generally the approximate spectra distribution of the useful information-bearing components is known from prior studies made in a given locality, and therefore the generator 10 will be adjusted to generate an estimated function character which has been referred to in this disclosure as $f_1(t)$. The theory of cross-correlation provides for a time delay between the two signals to be integrated and this delay is generally designated by the letter $\tau$, in mathematical parlance. In the system shown in Fig. 1, the time delay $\tau$ is provided by the splitting of the function $f_1(t)$ into quadrature components, $f_1(t)$ and $f_1(t+\tau)$. These components are multiplied respectively in the multipliers 16 and 18 by the seismic signal $f_2(t)$ which is common to both multipliers. Therefore the output signals from the two multipliers will be the same except that they will be displaced in time by the delay $\tau$, which in all cases is equal to one-quarter the wave length of the function $f_1(t)$, the character of which, as stated above, is predetermined by the estimated character of the information-bearing components of the seismic signal $f_2(t)$.

Again consider the simple case where $f_1(t)$ is a sine wave. Each of the multiplied signals is then squared to produce positive values which at D may be represented as $f_2^2(t)\sin^2\omega_1(t)$, and at E as $f_2^2(t)\cos^2\omega_1(t)$. As pointed out above, when these two functions are summed at F, they become $f_2^2(t)$, in which event it will be noted that the function $f_1(t)$ has cancelled out. The integrated output is therefore $$\int_0^T f_2^2(t)$$

which is the autocorrelation function of $f_2(t)$ where $\tau=0$. The fact that $\tau=0$ indicates that the output at G represents those components of the function $f_2(t)$ which are coherent with the sine wave $f_1(t)$ and thus it is apparent that the present correlation system is frequency selective.

By repeating this process of detection with the generator 10 and time shifter 12 set for a different function $f_1(t)$ each time, as may be done by means of the system shown in Fig. 3, the function $f_1(t)$ giving the best correlogram may be determined, and the information-bearing components of the seismic signal may be enhanced without resorting to "frequency domain" filtering.

The individual function correlators, K1 and K2, shown in Fig. 4 operate in the same manner as described above and the final cross-correction of the correlograms by the correlator KK is performed by simply integrating the two individual correlograms to produce a composite correlogram depending on the degree of coherence between the individual input functions, where one input function is shifted by the delay $\tau'$ with respect to the other input function.

I do not limit my invention to the exact forms shown in the drawings for changes may be made therein within the scope of the claims.

I claim:

1. The method of detecting and presenting seismic signals including the steps of creating a local disturbance in the earth, translating vibrations therefrom into an electrical signal, dividing said signal into two components, multiplying one component by a time function and the other component by a related time function but delayed in time, squaring the resulting products, and summing and continuously integrating the products to provide a composite correlogram wherein the said time functions have cancelled out.

2. The method of detecting and presenting seismic signals including the steps of creating a local disturbance in the earth, translating vibrations therefrom into an electrical signal, dividing said signal into two components, multiplying one component by a continuous time function and the other component by the same time function but delayed in time by one quarter the wave length of said function, squaring the resulting products, and summing and continuously integrating the products to provide a composite correlogram on the same time base as said electrical signal.

3. The method of detecting and presenting seismic signals including the steps of creating a local disturbance in the earth, translating vibrations therefrom into an electrical signal including reflected components of said disturbance, generating a continuous time function having wave form characteristics approximating as nearly as possible said reflected components, multiplying a first portion of said signal by said time function and squaring the resulting product, multiplying a second portion of said signal by said time function but delayed in time by one quarter the wave length of said function and squaring this resulting product, summing said products and continuously integrating the sum to provide a composite correlogram on the same time base as said electrical signal.

4. The method of "time-domain" filtering of desired components of a complex signal from noise components including the steps of generating a continuous time function having wave-form characteristics approximating as nearly as possible the characteristics of the desired components, dividing said time function into two series shifted in time into quadrature relation, separately multiplying each series by said signal and squaring the individual products, summing said products and continuously integrating the sum to produce a continuous correlogram on the same time base as said signal.

5. "Time-domain" filtering apparatus for use in detecting the presence of desired components in a complex signal comprising, a generator for generating a time function within the frequency spectrum of the said components; time shifting means for dividing said function into a first and a second time function mutually identical but in quadrature phase relation; a first multiplier for forming the product of said signal and said first quadrature function; a first squarer circuit for squaring said first product; a second multiplier for forming the product of said signal and said second quadrature function; a second squarer circuit for squaring said second product; a summing circuit for adding said squared products; and a leaky integrator circuit for integrating the sum of said squared products over the duration of said signal to provide a correlogram on the same time base as said signal.

6. In filtering apparatus as set forth in claim 5, a recorder for recording the complex signal; and reproducing means for playing back the signal a plurality of successive times, the signal being fed each time into the filter apparatus for correlation with the time function, and the characteristics of the time function being altered each time to enhance the representation in the correlogram of the desired components.

7. "Time-domain" filtering apparatus for detecting the presence of desired components in two or more related complex signals derived from separate sources comprising, a function correlator for each signal, each function correlator comprising a generator for generating a time function within the frequency spectrum of said components, time shifting means for dividing said function into a first and a second time function mutually identical but in quadrature phase relation, a first multiplier for forming the product of a selected input signal and said first quadrature function, a first squarer circuit for squaring said first product, a second multiplier for forming the product of the input signal and said second quadrature function, a second squarer circuit for squaring said second product, a summing circuit for adding said squared products, and a leaky integrator for integrating the sum of said squared products to provide a correlogram on the same time base as said selected input signal; and said apparatus including a cross-correlator for producing a composite correlogram, said cross-correlator comprising a multiplier circuit for forming the composite product of said correlograms of the individual function correlators, and a leaky integrator circuit for integrating the composite product over the duration of the said signals.

References Cited in the file of this patent

UNITED STATES PATENTS

| | | |
|---|---|---|
| 2,099,536 | Scherbatsjoy et al. | Nov. 16, 1937 |
| 2,340,272 | McCarty | Jan. 25, 1944 |
| 2,578,133 | Hawkins | Dec. 11, 1951 |
| 2,620,890 | Lee et al. | Dec. 9, 1952 |
| 2,643,819 | Lee et al. | June 30, 1953 |
| 2,688,124 | Doty et al. | Aug. 31, 1954 |
| 2,752,092 | McDonal | June 26, 1956 |
| 2,779,428 | Silverman | Jan. 29, 1957 |
| 2,794,965 | Yost | June 4, 1957 |